United States Patent
Noda et al.

(10) Patent No.: US 7,395,709 B2
(45) Date of Patent: Jul. 8, 2008

(54) FALL DETECTION DEVICE

(75) Inventors: Masaru Noda, Kanagawa (JP); Yasunori Abe, Mohka (JP)

(73) Assignee: Hitachi Metals Ltd., Tokyo (JP)

( * ) Notice: Subject to any disclaimer, the term of this patent is extended or adjusted under 35 U.S.C. 154(b) by 80 days.

(21) Appl. No.: 11/457,484

(22) Filed: Jul. 14, 2006

(65) Prior Publication Data

US 2007/0030587 A1 Feb. 8, 2007

(30) Foreign Application Priority Data

Aug. 5, 2005 (JP) .............................. 2005-228026

(51) Int. Cl.
  *G01P 15/08* (2006.01)
  *G11B 21/02* (2006.01)
(52) U.S. Cl. .......................................... 73/510; 360/75

(58) Field of Classification Search ................... 73/510, 73/514.01, 514.35; 340/669; 702/141; 360/75
See application file for complete search history.

(56) References Cited

U.S. PATENT DOCUMENTS 5,982,573 A 11/1999 Henze
2006/0152842 A1* 7/2006 Pasolini et al. ................ 360/75

FOREIGN PATENT DOCUMENTS

JP 2000-241442 9/2000

* cited by examiner

*Primary Examiner*—John E Chapman
(74) *Attorney, Agent, or Firm*—Sughrue Mion, PLLC

(57) ABSTRACT

A fall detection device is provided, which accomplishes a fall judgment on acceleration by a simple calculation and improves uniformity of effective threshold value for the acceleration judgment as to a direction of an applied acceleration vector. The fall detection device produces a fall detection signal when an absolute value of each axis component of an acceleration measured by a three-axis acceleration sensor is less than a first threshold value, and when a sum of the absolute values of the axis components of the acceleration is less than a second threshold value that is 1.5 times to twice the first threshold value.

4 Claims, 5 Drawing Sheets

FALL DETECTION DEVICE

BACKGROUND OF THE INVENTION

1. Field of the Invention

The present invention relates to a fall detection device that can be used for a fall protection of mobile electronic devices and the like, on which a hard magnetic disk drive is installed.

2. Description of the Related Art

Mobile electronic devices inherently have high risks that the devices might be dropped by accident. The mobile electronic devices, such as a notebook PC and some kinds of digital music players, encompassing a hard magnetic disk drive are particularly delicate to impacts and need measures for protection against a fall. When those devices are held still on the earth, gravity is applied on them. But, since acceleration relative to a device is not applied on an acceleration sensor installed on the device during free fall, the acceleration measured by the acceleration sensor becomes zero ideally or extremely small. So, it is usual that the free fall of the devices is detected through a judgment whether or not a measured acceleration is less than a certain threshold, and that a protective counter-measure is taken on the detection result. Such fall judgments are described in Japanese Laid-open Patent 2000-241442 and U.S. Pat. No. 5,982,573. In the Japanese patent document, when an installed three-axis acceleration sensor detects each of the axis components of an acceleration signal that is a small amount of almost zero and continues a certain time period, it is judged that the sensor is in free fall, and a magnetic head is moved to a shelter region to avoid a magnetic drive from breaking down due to impact on the end of falling. In the US patent document, a fall is detected when a magnitude of a compound vector of three-axis accelerations is less than a certain threshold for longer than 90 milli-seconds to move a magnetic head to a shelter region and avoid a magnetic disk drive from breaking down by impact on the end of falling.

In the fall detection described in the Japanese patent document, each of the absolute values of the axis-direction components of acceleration measured by the three-axis acceleration sensor is compared with a certain value (called a threshold value Th), and when each of the absolute values of the acceleration components is less than the threshold value Th, it is judged in free fall. That is, each of the absolute values of the x-axis component Ax, y-axis component Ay and z-axis component Az of the acceleration is compared with the threshold value Th, and it is judged in free fall when each of them is less than the threshold value Th. So, presuming that the measured acceleration A (Ax, Ay, Az) is applied at the origin O in the orthogonal coordinates shown in FIG. 5A, it is judged whether or not the acceleration A is encompassed in a cube having each side length Th in the x-axis, y-axis and z-axis directions. If the acceleration A is composed of only one of the x-axis component, the y-axis component and the z-axis component, it is not judged in free fall when the magnitude of the acceleration is more than the threshold value Th. But, in the cube of a side length Th shown in FIG. 5A, the diagonal direction distance from the origin O to a vertex closest to an observer of the cube is $\sqrt{3}$ Th. When a measured acceleration A is in the diagonal direction, it is necessary that the magnitude of the acceleration is not less than $\sqrt{3}$Th in order to avoid a judgment that it is in free fall. There are, however, some cases that it is judged to be freely falling, although the detected acceleration is more than the threshold value Th.

In the fall detection described in the US patent document, the magnitude of the compound vector of the axis-direction acceleration components measured by a three-axis acceleration sensor is compared with a certain value (a threshold value Th) and, when the magnitude of the compound vector is less than the threshold value, it is judged in free fall. In the orthogonal coordinates shown in FIG. 5B, at which origin O the measured acceleration A (Ax, Ay, Az) is applied, it is judged whether or not the acceleration A is contained in a sphere having a center at the origin O and a radius Th. In whichever direction on the sphere the acceleration A is directed, the magnitude of the acceleration A can be compared with the threshold value Th. In order to compare the magnitude of the acceleration A with the threshold value, however, it is necessary to square each of the axis components of the acceleration and to calculate a square root of the sum of the squares. Since a sum square calculation needs a comparatively large-scaled calculation circuit, it would be an obstacle to miniaturize of an IC for the calculation circuit.

SUMMARY OF THE INVENTION

An object of the present invention is to provide a fall detection device, in which uniformity of an effective threshold value for acceleration judgment as to a direction of an acceleration vector is improved, and which is able to accomplish a fall judgment by a simple calculation based on measured acceleration.

The fall detection device of the present invention comprises:

a three-axis acceleration sensor for measuring each axis component of an applied acceleration and generating each of the axis components of measured acceleration, a first comparison means that compares an absolute value of each of the axis components of the measured acceleration with a first threshold value and produces a first output when the absolute value is less than the first threshold value, a second comparison means that compares a sum of the absolute values of the axis components of the measured acceleration with a second threshold value and produces a second output when the sum is less than the second threshold value, and a fall detection means that produces a fall detection signal when the first comparison means produces the first output and when the second comparison means produces the second output.

The fall detection device of the present invention compares the absolute value of each of the axis components of the measured acceleration with the first threshold value and the sum of the absolute values of the axis components of the acceleration with the second threshold value. When the absolute value of each of the measured axis components is equal to the first threshold value, the sum of the absolute values becomes the biggest and $\sqrt{3}$ times the first threshold value. By setting the second threshold value to an appropriate value, a judgment at the second comparison means can be made negative when there is no falling, and a fall detection signal can be avoided.

For instance, the second threshold value is set to $\sqrt{3}$ times the first threshold value. When the absolute values of each axis component of a measured acceleration are identical to each other, and when a sum of the absolute values of the axis components is the second threshold value, the magnitude of an acceleration vector is the same as the first threshold value. So, comparing a sum of absolute values of the axis components of a measured acceleration with the second threshold value is the same as comparing the magnitude of the acceleration vector with the first threshold value and judging a fall when it is less than the first threshold value.

It is preferable that the second threshold value is 1.5 times to twice the first threshold value. If the second threshold value is made less than 1.5 times the first threshold value, it might be judged there is no falling even when an applied acceleration is so small that it is in fact falling. By contrast, if the second threshold value is more than twice the first threshold value, it might be judged on fall even when an applied acceleration is so large that there is no falling. Further, even when acceleration is not applied, an acceleration sensor has a certain amount of offset output. In order to avoid a mistaken judgment due to the offset output, it is desirable that the second threshold value is 1.5 times to twice the first threshold value.

Also, in the fall detection device described above according to the present invention, it is preferable that the fall detection means produces a fall detection signal when the outputs of the first comparison means and the second comparison means last a predetermined time. The fall detection outputs from the first and/or second comparison means may disappear in a short time after a fall starts. For example, the acceleration sensor is vibrated, or a counter-measure for fall avoidance is taken for a device. To avoid a fall detection judgment in such cases, it is desirable that it is determined whether outputs from the first comparison means and the second comparison means continue a predetermined time or not and that a fall detection signal is produced only when the outputs last such a predetermined time.

The fall detection device according to the present invention can carry out an acceleration judgment by a simple calculation without a sum square calculation and improve uniformity of effective threshold values for acceleration detection with respect to a direction of an acceleration vector.

DETAILED DESCRIPTION OF THE PREFERRED EMBODIMENTS

Example 1

Figure 1:
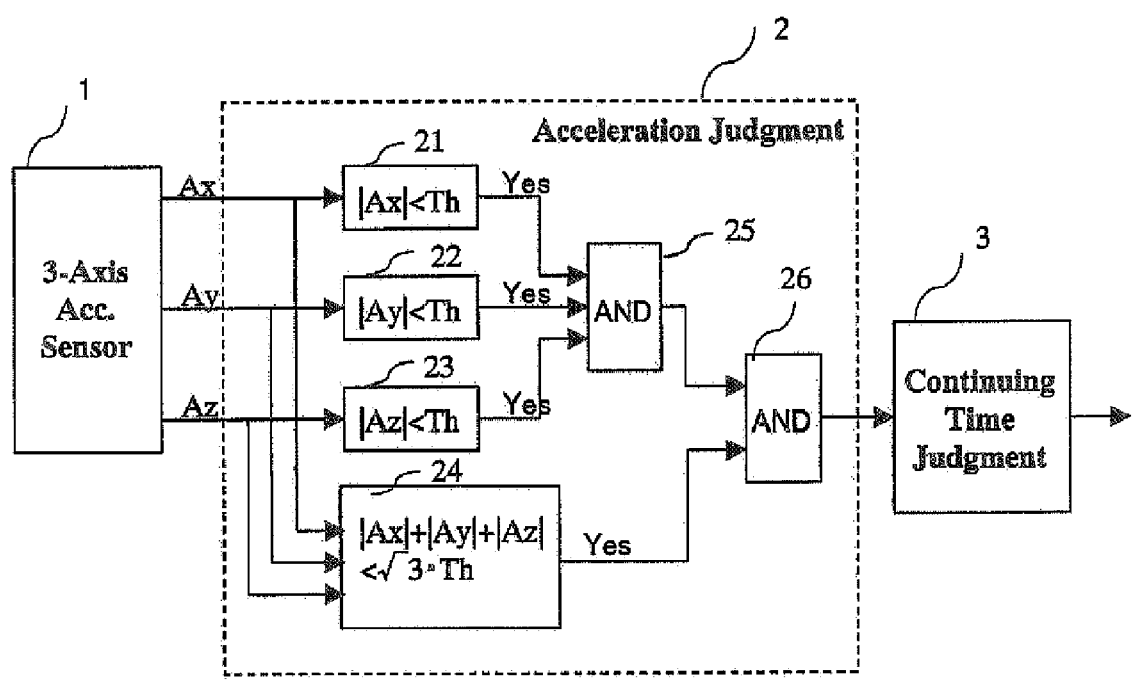
FIG. 1 is a block diagram showing a fall detection device according to EXAMPLE 1 of the present invention.

A fall detection device according to EXAMPLE 1 of the present invention is shown in the block diagram of FIG. 1. The fall detection device of FIG. 1 is composed of a three-axis acceleration sensor 1, an acceleration judgment means 2 and a continuing time judgment means 3. The acceleration judgment means 2 comprises first comparison means 21, 22 and 23, which judge whether it is true or not that an absolute value of each axis component Ax, Ay and Az of a measured acceleration is less than a first threshold value Th, and a second comparison means 24, which judges whether it is true or not that a sum of the absolute values of axis components Ax, Ay and Az of the measured acceleration is less than a second threshold value being $\sqrt{3}$ times the first threshold value, and transfers judgment results of the first comparison means 21, 22, 23 to a logical product circuit 25 that produces an output (first output) "true" when all the judgment results of the first comparison means 21, 22, 23 are "true" (yes). The output from the logical product circuit 25 and a judgment result of the second comparison means 24 are transmitted into a logical product circuit 26 that produces an acceleration judgment output, when the output (first output) of the logical product circuit 25 is "true" and when the judgment result (second output) from the second comparison means 24 is "true" (yes). Here, an acceleration judgment is to judge whether or not a measured acceleration is less than a certain value, and an acceleration judgment output means an output of "there is falling" as a judgment result. The acceleration judgment output can be used as a fall detection signal as it is. Alternatively, a result of a judgment by the continuing time judgment means 3 as to whether or not the small acceleration state (or in a free fall state) lasts more than a predetermined time can be used for the fall detection signal.

Figure 2A:
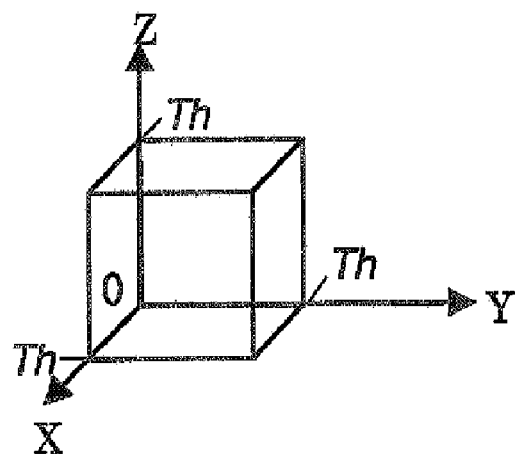
FIG. 2A is an explanatory drawing showing a region on three-axis orthogonal coordinates, in which each axis component of acceleration is less than a first threshold value Th.
Figure 2B:
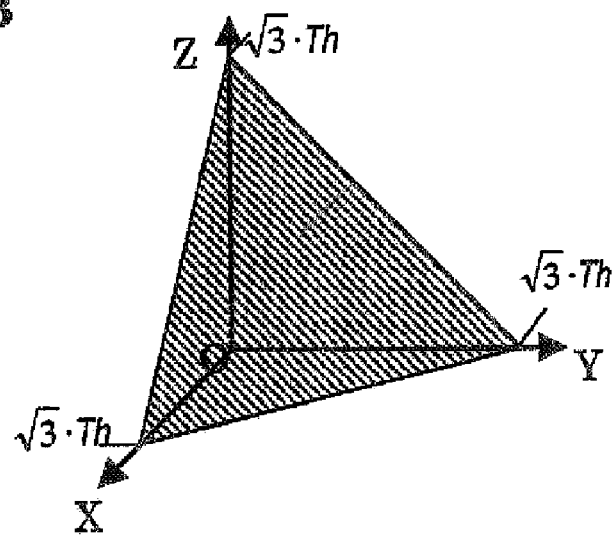
FIG. 2B is an explanatory drawing showing a region on three-axis orthogonal coordinates, in which a sum of the absolute values of the axis components of the acceleration is less than a second threshold value being $\sqrt{3}$ times the first threshold value Th.

An acceleration judgment region of the present invention is depicted in FIG. 2. When absolute values of acceleration components are treated, it is sufficient that only positive regions of x-axis, y-axis and z-axis are discussed, and FIG. 2 depicts only the positive regions of the three axes. Remaining regions can be thought symmetric with respect to the axes and the origin. FIG. 2A shows a region of judgment results of the first comparison means 21, 22, 23 being all "true" (yes) by a cube having a side length Th. When each of axis components of the measured acceleration has a magnitude of the threshold value Th, the acceleration vector is directed in the diagonal direction of the cube, and the magnitude of the acceleration vector is $\sqrt{3}$ Th. FIG. 2B shows a region of the judgment result of the second comparison means 24 being "true" (yes). A plane passing three points being at $\sqrt{3}$ Th on each axis is shown by a triangle hatched by oblique lines, and a region that the judgment result of the second comparison means 24 is "true" (yes) is under the plane, that is, on the origin side of the plane. Assuming that absolute values |Ax|, |Ay| and |Az| of the axis-direction components of an acceleration are put as X, Y and Z, respectively, the plane is shown by a formula:

$$X+Y+Z=\sqrt{3}\text{Th} \quad \text{(Formula 1)}$$

and, the region under the plane is shown by a formula:

$$X+Y+Z<\sqrt{3}\text{Th} \quad \text{(Formula 2)}.$$

A vertical line from the origin to the plane meets a diagonal line of the above-mentioned cube, and the length of the vertical line is equal to Th.

Figure 2C:
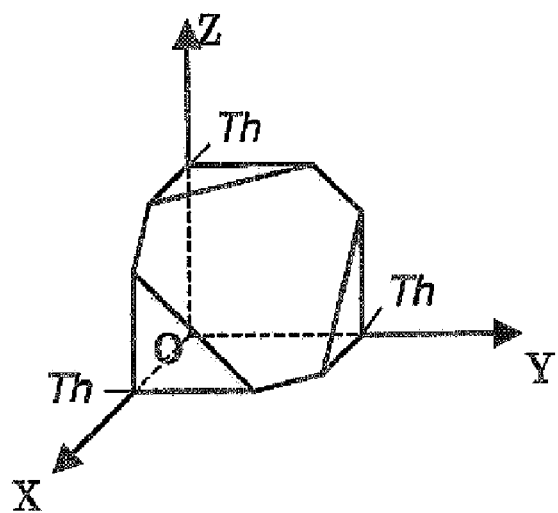
FIG. 2C is an explanatory drawing showing an acceleration judgment region of the present invention.

FIG. 2C shows a common region of FIG. 2A and FIG. 2B. That is a region that the judgment results of the first comparison means are all "true" (yes) and the judgment result of the second comparison means is "true" (yes). It shows a shape in which the plane of FIG. 2B removes a part around a vertex closest to an observer of the cube in FIG. 2A. By the common region, a threshold value in the diagonal direction of the cube is reduced to Th from $\sqrt{3}$ Th. An effective threshold value becomes the biggest at vertexes of a deformed hexagon shown in FIG. 2C, and it is about 1.24Th. As is apparent from FIG. 2, the ratio of the maximum value to the minimum value in effective threshold value is reduced to 1.24 by combining the result from the second comparison means with the result from the first comparison means in the present invention, while if the result of only the first comparison means is considered, the ratio is 1.73 using only the first comparison means. Thus, uniformity of the effective threshold value is improved. Although the uniformity is impaired when the second threshold value varies far from $\sqrt{3}$ times the first threshold value, the uniformity of the effective threshold value is acceptable when the second threshold value is 1.5 times to twice the first threshold value.

Example 2

Figure 3:
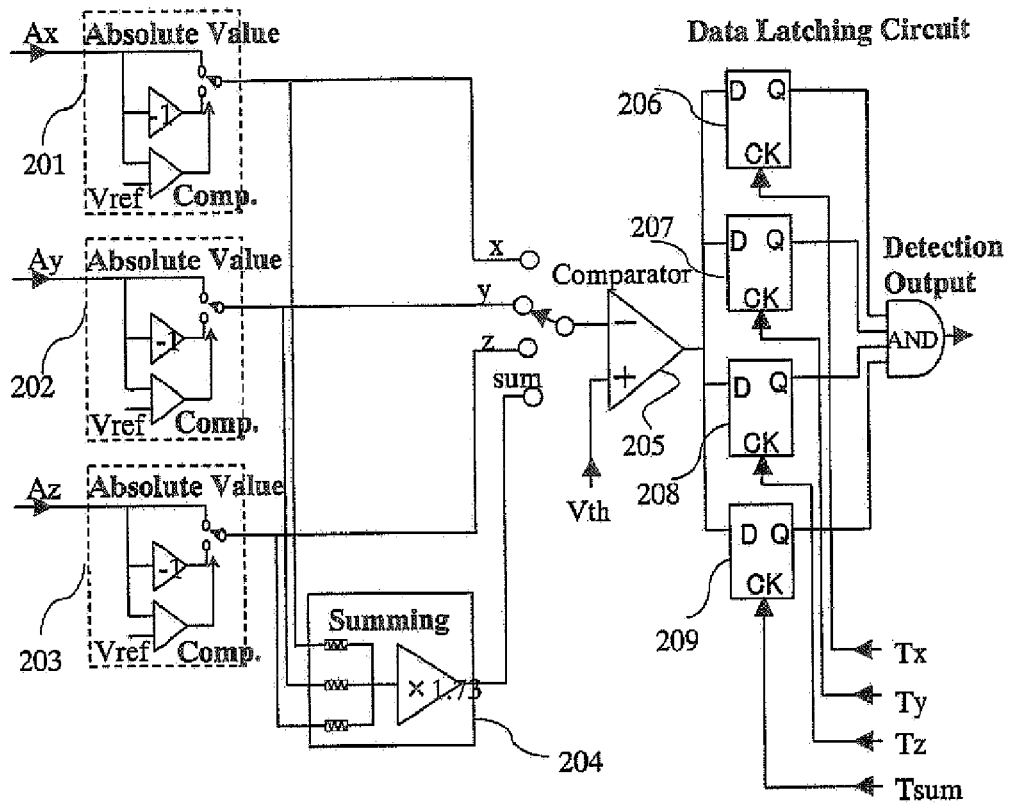
FIG. 3 is a block diagram showing a fall detection device according to EXAMPLE 2 of the present invention.

A fall detection device according to EXAMPLE 2 of the present invention is shown in a block diagram of FIG. 3, which shows a specific structure of an acceleration judgment means. Absolute value circuits 201, 202 and 203 receive detection outputs, that is, analog voltages Ax, Ay, Az of axis components, from a three-axis acceleration sensor (not shown) and switch between reversal and anti-reversal depending on the detection outputs being higher or lower than a reference voltage Vref corresponding to zero acceleration to produce absolute values of the detection outputs. A comparator 205 compares the outputs from the absolute value circuits with a threshold voltage Vth in turns and produces "1" when the output is lower than the threshold voltage Vth. Although the threshold voltage Vth is offset by the reference voltage Vref corresponding to the zero acceleration, the offset is omitted from the description of the fall detection device here. Each of the absolute value circuits 201, 202, 203 combined with the comparator 205 corresponds to a first comparison means for each of the axis components of acceleration. A summing circuit 204 makes a sum of the three outputs from the absolute value circuits multiplied by one third by using a resistance summing and amplifies it to 1.73 times. Since 1.73 times corresponds to $\sqrt{3}$ times, the product of $\sqrt{3}$ to the sum is effectively equivalent to a multiplication of a coefficient $1/\sqrt{3}$ to the sum of the absolute values of analog voltages Ax, Ay, Az of the axis components of the measured acceleration.

The comparison of the output from the summing circuit 204 with the threshold voltage Vth at the comparator 205 is effectively equivalent to a comparison of the sum of the absolute values of Ax, Ay and Az with $\sqrt{3}$ Th and represents a judgment corresponding to the above-mentioned formula 2. That is, it corresponds to the second comparison means of the present invention. As explained above, the comparator 205 compares each of the absolute values of Ax, Ay and Az and their sum with the threshold value in turns. Data latching circuits 206, 207, 208, 209 carry out a data latching of logic outputs from the comparator 205 at each of the times of latching pulses Tx, Tv, Tz and Tsum synchronizing with the input switching at the comparator. Since the data latching circuit holds latched data until a next data latching timing, an acceleration judgment output can be obtained by a logical product of latched data from all the data latching circuits. The EXAMPLE has an advantage that a single comparator can carry out all of the comparisons because the comparisons with the threshold value is made in turns.

Example 3

Figure 4:
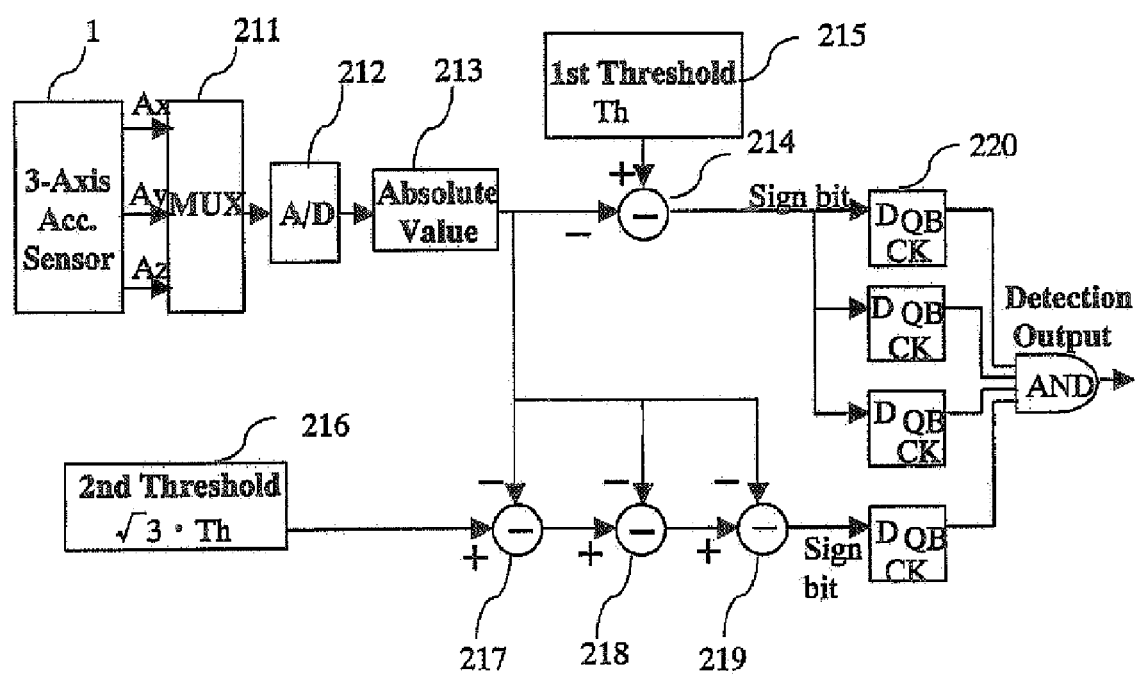
FIG. 4 is a block diagram showing a fall detection device according to EXAMPLE 3 of the present invention.
Figure 5A:
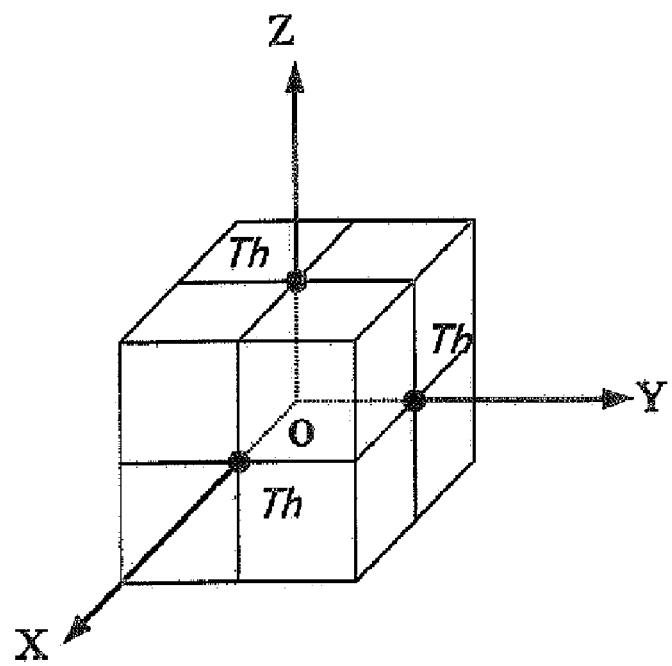
FIG. 5A is an explanatory drawing showing a region, in which each axis component of acceleration is less than a threshold value Th.
Figure 5B:
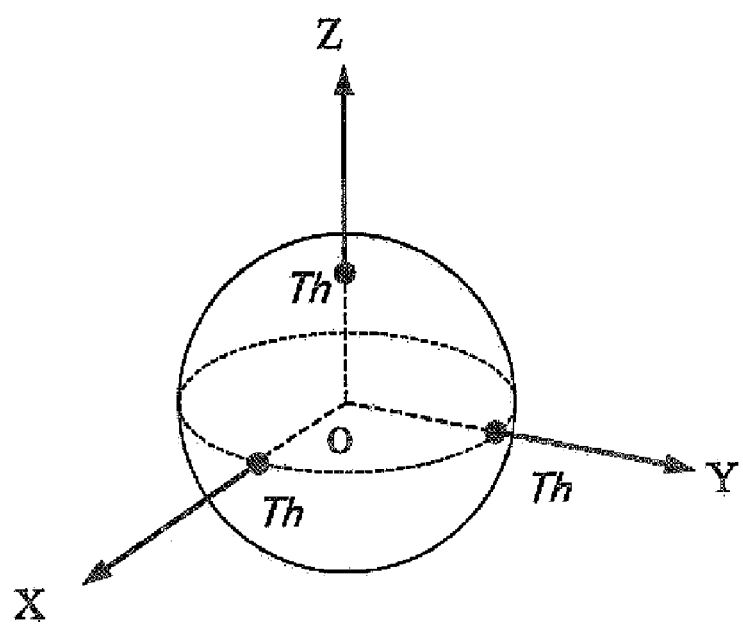
FIG. 5B is an explanatory drawing of a region, in which the magnitude of the acceleration is less than a threshold value.

A fall detection device according to EXAMPLE 3 of the present invention is shown in a block diagram of FIG. 4. FIG. 4 describes a specific example using a digital signal processing at an acceleration judgment means. The acceleration judgment means of EXAMPLE 3 is composed of a multiplexier 211, an A/D converter 212, an absolute value circuit 213, subtraction circuits 214, 217, 218, 219, a storage register 215 of a first threshold value, a storage register 216 of a second threshold value and data latching circuits 220. Analog output signals from a three-axis acceleration sensor 1 are time-sheared by the multiplexier 211 and transmitted to the A/D converter 212 to produce digital data. The digital data are in a form of a complementary number of 2 and usually parallel data composed of plural bits containing a positive/negative sign bit, but FIG. 4 shows simply the digital data by a single line. When a sign bit is "1" which represents negative, an absolute value is obtained by reversing the whole bits containing the sign bit and adding 1. The subtraction circuit 214 subtracts an absolute value of the acceleration from the first threshold value Th. When the absolute value of the acceleration is less than the first threshold value Th, the subtraction result is positive and a sign bit becomes zero. In the same manner, the subtraction circuit 217 subtracts the absolute value of x-axis acceleration from the second threshold value $\sqrt{3}$ Th, and, in turn, the subtraction circuits 218, 219 subtract the absolute values of y-axis and z-axis acceleration, respectively. When the sum of the absolute values of the axis components of the acceleration is less than the second threshold value, a subtraction result at the final subtraction circuit 219 is positive and its sign bit is zero. By latching these sign bits at the latching circuits 220 in turns and making logical products of reversed outputs QB from the latching circuits, an acceleration judgment output is obtained. It is apparent that the digital signal processing treated by devices down-stream from the A/D converter can be carried out by software working a microprocessor.

As explained above, the acceleration judgment can be accomplished by a simple calculation in the present invention without using a complicated sum square calculation, and a fall detection device is realized in which uniformity of effective threshold values for acceleration judgment is improved with respect to acceleration vector directions. The fall detection device of the present invention can be installed on a mobile electronic device to detect a fall of the mobile electronic device and take protective measures against the fall.

What is claimed is:

1. A fall detection device comprising:
  a three-axis acceleration sensor for measuring each axis component of an applied acceleration and generating each of axis components of measured acceleration,
  a first comparison means that compares an absolute value of each of the axis components of the measured acceleration with a first threshold value and produces a first output when the absolute value is less than the first threshold value,
  a second comparison means that compares a sum of the absolute values of the axis components of the measured acceleration with a second threshold value and produces a second output when the sum is less than the second threshold value, and
  a fall detection means that produces a fall detection signal when the first comparison means produces the first output and when the second comparison means produces the second output.

2. A fall detection device as set forth in claim 1, wherein the fall detection means produces the fall detection signal when the first output produced by the first comparison means and the second output produced by the second comparison means last a predetermined time.

3. A fall detection device as set forth in claim 1, wherein the second threshold value is 1.5 times to twice the first threshold value.

4. A fall detection device as set forth in claim 2, wherein the second threshold value is 1.5 times to twice the first threshold value.

* * * * *